BEST AVAILABLE COPY

C. JUDSON.

CORSET-SPRING.

No. 7,729. Reissued June 12, 1877.

7,729. Corset-Springs. C. Judson, Newton, Mass. Patent No. 7,034, dated Apr. 4, 1876. [Filed May 15, 1877.]

1. In a corset-clasp, the combination, with the busk *a*, of the short strengthening steel *d*, said steel *d* being fastened or fixed to the said busk upon each side of the waist portion or center of the busk, and having its ends free, as and for the purpose herein specified.

2. In a corset-clasp, a busk or spring, having its studs or fastening devices placed near the edge farther from that side of said busk or spring over which the fastening-spring is brought to be attached to said busk or spring, thus causing the said fastening-spring to lie upon said busk or spring near its center or farther edge, for the purpose set forth.

3. In a corset-clasp, the herein described springs *a d b* and studs *a'*, arranged so that, when clasped, the spring *b* lies centrically over and upon the springs *d* and *a*, thus constituting a pile of three springs, as and for the purpose above described.

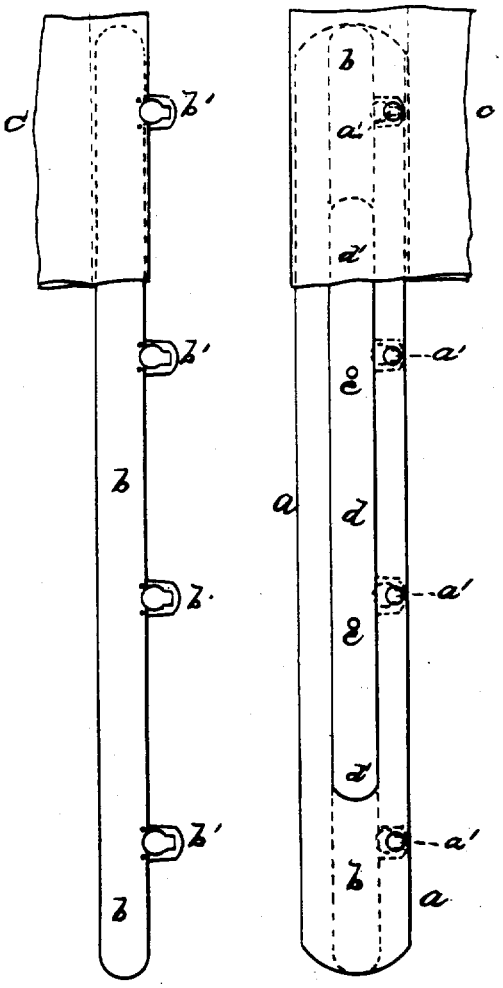

Fig. 1.

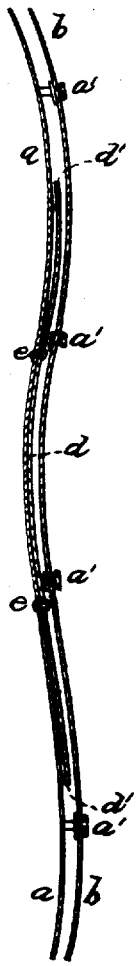

Fig. 2.

WITNESSES Catharine Judson INVENTOR

Jas. H. Reed Jr. By her Att'ys.

B. W. Williams Henry W. Williams Jr.

N. PETERS, PHOTO-LITHOGRAPHER, WASHINGTON, D. C.

UNITED STATES PATENT OFFICE.

CATHARINE JUDSON, OF NEWTON, MASSACHUSETTS.

IMPROVEMENT IN CORSET-STRINGS.

Specification forming part of Letters Patent No. 173,124, dated February 18, 1876; Reissue No. 7,034, dated April 4, 1876; Reissue No. 7,729, dated June 12, 1877; application filed May 15, 1877.

*To all whom it may concern:*

Be it known that I, CATHARINE JUDSON, of Newton, in the county of Middlesex and State of Massachusetts, have invented a new and valuable Improvement in Corsets; and I do hereby declare that the following is a full, clear, and exact description thereof, reference being had to the accompanying drawing, and to the letters of reference marked thereon.

My invention relates particularly to that portion of a corset known as the "clasp" or "spring," and is intended to strengthen the clasp or busk, and especially at that portion where breakage is most liable to occur—viz., at the part near the natural waist—by means, partly, of an additional supporting steel or spring, fixed immovably upon the wide steel or busk at two points, one above and the other below the waist or center of the busk, and having its ends free.

I am aware that inventions have been patented which include additional strengthening-steels, unfastened or fastened, at the center to the main steel.

The advantage which my strengthening-steel, fastened at the two points above named, has over steels unfastened or fastened at their centers to the busk is that, between the points of fastening, the steels, being kept stiff by the fastenings, help to support each other, while, if they were fastened merely at the center, the additional strength would only be the strength of an unaided steel, even then weakened by the fastening process.

Again, in order to strengthen the clasp, the studs are placed near that edge of the busk which is farther from the hooking or fastening spring. This is the reverse of the usual position, and it brings the fastening-spring, when clasped, directly over the strengthening-steel and over the center of the busk. Thus the three steels are piled upon each other, and their strength combined; and, even if the strengthening-steel be omitted, the fastening-steel, instead of being beside the busk or upon the side of it, lies upon its center, by means of the position of the studs, upon the left, instead of the right, side.

In the accompanying illustration, Figure 1 is a view of a corset-clasp embodying my invention. The clasp is represented as unfastened, and a portion of the cloth of the corset is attached to the upper portion. Dotted lines show the position of the fastening-spring when clasped. Fig. 2 is a longitudinal section of the clasp when fastened, showing the busk, strengthening-steel, and fastening-spring in a pile.

Similar letters of reference indicate corresponding parts.

*a* is the wide steel or busk, provided with studs *a'*, or similar devices. These studs are placed upon the left side (as it is worn) of the busk, that being the farther side from the fastening-spring *b*, which is provided with hooks *b'*, or similar devices. The springs *a* and *b* form the clasp, and rest in pockets in the corset *c*, in the positions shown in the drawing. Attached to the wide spring *a*, by means of rivets or similar fastening devices *e*, is a strengthening steel or spring, *d*. This steel *d* does not extend for the entire length of the springs *a b*, but is a short steel, placed where it is most needed—*i. e.*, near the center of the clasp-springs at the natural waist, where the springs are bent and strained the most. This steel is not provided with any clasping devices, but is solely a strengthener, made as small as possible. The ends *d'* are left free, while from *c* to *e* it is stiff and immovable. It lies in the same pocket as the steel or spring *a*, and could easily be omitted, if desired.

It will thus be seen that the clasp is strengthened, first, by the position of the fastening-spring *b*, hooking over to the farther side of the busk *a*; and, second, by the small steel *d*, arranged as described.

Having thus fully described my invention, what I claim, and desire to secure by Letters Patent, is—

1. In a corset-clasp, the combination, with the busk *a*, of the short strengthening-steel *d*, said steel *d* being fastened or fixed to the said busk upon each side of the waste portion or center of the busk, and having its ends free, as and for the purpose herein specified.

2. In a corset-clasp, a busk or spring, having its studs or fastening devices placed near the edge farther from that side of said busk or spring over which the fastening-spring is brought to be attached to said busk or spring, thus causing the said fastening-spring to lie upon said busk or spring near its center or farther edge, for the purpose set forth.

3. In a corset-clasp, the herein described springs *a b d* and studs *a'*, arranged so that, when clasped, the spring *b* lies centrically over and upon the springs *d* and *a*, thus constituting a pile of three springs, as and for the purpose above described.

CATHARINE JUDSON.

Witnesses:

HENRY W. WILLIAMS,

B. W. WILLIAMS.